(12) United States Patent
Ertl

(10) Patent No.: US 8,281,669 B2
(45) Date of Patent: Oct. 9, 2012

(54) SIMPLIFIED ORIFICE TYPE DIFFERENTIAL PRESSURE FLOW METER WITH IMPROVED ACCURACY

(76) Inventor: Daniel A Ertl, Anderson, IN (US)

(*) Notice: Subject to any disclaimer, the term of this patent is extended or adjusted under 35 U.S.C. 154(b) by 336 days.

(21) Appl. No.: 12/551,628

(22) Filed: Sep. 1, 2009

(65) Prior Publication Data

US 2010/0050782 A1    Mar. 4, 2010

Related U.S. Application Data

(60) Provisional application No. 61/190,734, filed on Sep. 2, 2008.

(51) Int. Cl.
*G01F 1/42* (2006.01)
*G01F 1/37* (2006.01)
(52) U.S. Cl. .............. 73/861.61; 73/861.52; 73/272 R
(58) Field of Classification Search .................... None
See application file for complete search history.

(56) References Cited

U.S. PATENT DOCUMENTS

| | | | | |
|---|---|---|---|---|
| 3,812,882 A * | 5/1974 | Taylor | ............... | 137/556.6 |
| 4,011,650 A * | 3/1977 | Granada | ............... | 29/421.1 |
| 4,393,722 A * | 7/1983 | Scott | ............... | 73/861.61 |
| 4,422,339 A * | 12/1983 | Gall et al. | ............... | 73/861.61 |
| 4,499,919 A * | 2/1985 | Forester | ............... | 137/613 |
| 4,503,594 A * | 3/1985 | Gall et al. | ............... | 29/890.142 |
| 4,613,325 A * | 9/1986 | Abrams | ............... | 604/65 |
| 4,909,476 A | 3/1990 | Messick | | |
| 5,108,075 A | 4/1992 | Downard et al. | | |
| 5,246,201 A | 9/1993 | Messick | | |
| 5,469,883 A * | 11/1995 | Lee | ............... | 137/513.3 |
| 5,488,969 A | 2/1996 | King et al. | | |
| 5,617,899 A * | 4/1997 | Linton et al. | ............... | 138/44 |
| 5,760,301 A | 6/1998 | Shuman, Jr. | | |
| 6,053,055 A * | 4/2000 | Nelson | ............... | 73/861.52 |
| 6,101,885 A * | 8/2000 | Touzin et al. | ............... | 73/861.22 |
| 6,202,483 B1 | 3/2001 | Barcus | | |
| 6,840,495 B2 * | 1/2005 | Jahn et al. | ............... | 251/63.5 |
| 6,871,666 B1 * | 3/2005 | Loga et al. | ............... | 137/601.18 |
| 6,968,851 B2 * | 11/2005 | Ramirez et al. | ............... | 137/1 |
| 7,293,471 B2 | 11/2007 | Lund Bo et al. | | |
| 7,461,563 B1 * | 12/2008 | Peng et al. | ............... | 73/861.52 |
| 7,782,461 B1 * | 8/2010 | Massey et al. | ............... | 356/436 |

* cited by examiner

*Primary Examiner* — Harshad R Patel
(74) *Attorney, Agent, or Firm* — Ritchison Law Offices, PC; John D Ritchison

(57) ABSTRACT

A flow meter device that improves a way to obtain an accurate differential pressure across an orifice body situated in line with the flow of gas and liquids. The orifice body is held in place by sealing components integrated into the orifice body. The differential pressure is sensed via openings incorporated into the body of the device, upstream and downstream of the orifice body. The device with its improved accuracy may be used for small and large applications measuring flow. The device is comprised of a meter body; an orifice puck with characteristics; a sealing method; a cover plate, and a way to secure the device into a fluid stream where the device may be used to easily and accurately measure fluid flow in a pipe.

16 Claims, 7 Drawing Sheets

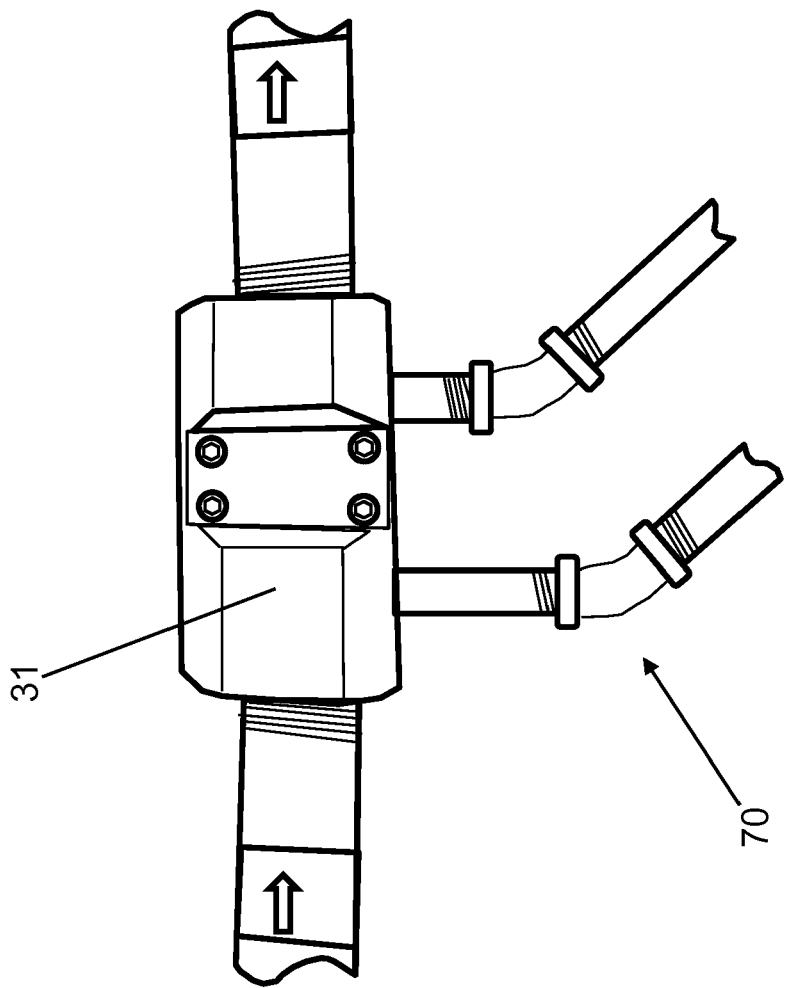
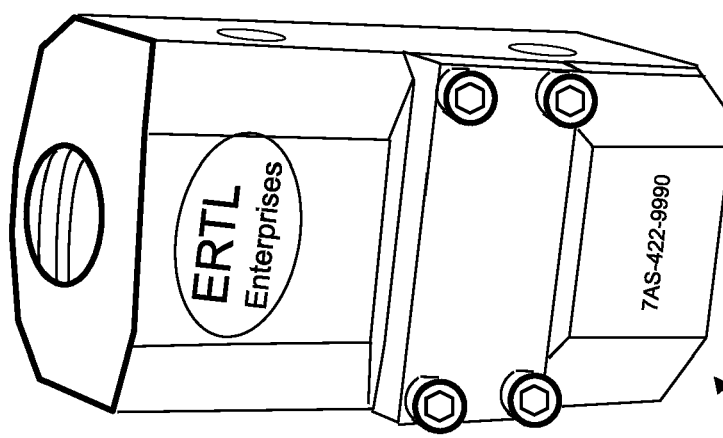
Fig. 1A
Fig. 1B
Fig. 1

SIMPLIFIED ORIFICE TYPE DIFFERENTIAL PRESSURE FLOW METER WITH IMPROVED ACCURACY

CROSS-REFERENCE TO RELATED APPLICATIONS

This application claims the benefit of Provisional Patent Application Ser. No. 61/190,734 filed Sep. 2, 2008 by Daniel A. Ertl and entitled "Simplified Flow Meter with Improved Accuracy".

FIELD OF INVENTION

This invention relates to a flow meter employing a means to obtain an accurate differential pressure across an orifice body situated in line with the flow. The orifice body is held in place by means of sealing components integrated into the orifice body. The differential pressure is sensed via openings incorporated into the body of the device, upstream and downstream of the orifice body. This device is a new combination of existing and new materials configured with unique features that provide an effective, practical and economical way to provide a flow meter device for gaseous and fluid applications. The preferred embodiment is described below and comprised of fewer parts in a simpler configuration than prior art devices.

FEDERALLY SPONSORED RESEARCH

None.

SEQUENCE LISTING OR PROGRAM

None.

BACKGROUND—FIELD OF INVENTION AND PRIOR ART

A. Introduction of the Problems Addressed

The problem solved involves one related to a long felt need in the gas and fluid industry to have a simple, compact control valve. Over the years, complex and bulky valves have been the mainstay. The new Simplified Flow Meter with Improved Accuracy has particular combinations of materials and features that are unique and novel and are not anticipated by prior art. Likewise, use of Simplified Flow meter with Improved Accuracy provides significant benefits compared to prior art devices.

B. Prior Art

The historical technology focused on devices that only helped with fairly expensive and complex designs. One such device is shown by a 1990 U.S. Pat. No. 4,909,476 issued to Messick. Entitled an "Orifice assembly for gas metering device" the art shows an improvement in the orifice assembly of a high pressure gas flow meter. The overall features and combinations of the device is still complex and associated with a device with numerous interconnecting components. Another device was issued as U.S. Pat. No. 5,108,075 (1992) to Downard, et al. It shows a complex orifice valve assembly which may be utilized to control the flow of a fluent material, such as powdered magnesium, propelled by gas under pressure, the valve controlling the flow in a linear manner. The valve includes a valve body having first and second adjacent concentric bores, the first bore being of a larger diameter than the second bore, and a cross-bore intersecting the first bore, the cross-bore having a cylindrical portion which intersects the first bore and inlet and outlet portions to either side of the cylindrical portion. The device differs greatly from Ertl art in that is uses a complex system and a spherical type orifice as opposed to a disk with an orifice.

Another orifice assembly for gas metering device by Messick is shown in U.S. Pat. No. 5,246,201 (1993). This device is an orifice assembly for use in sealed fluid connection between a gas inlet and gas outlet in a gas flow meter includes a rotor positioned for rotatable movement in fluid connection with both the gas inlet and gas outlet. The rotor includes a plurality of bores in a first circular plate and a matching number of gas passageways in a second circular plate, the passageways being aligned with the bores. The device is a series of complex parts and has a non-simple set point method. Another U.S. Pat. No. 5,488,969 (1996) was issued to King, et al. The prior art teaches a method and a metering valve for metering a fluid by incrementally adjusting a position of a flow control element that directly varies a flow area of a flow port opening in a valve housing. The flow control element is adjustably mounted with respect to the valve housing. The metering valve maintains an approximately constant percentage variation of a mass flow rate of a fluid with respect to the current total flow rate flowing through the flow port opening, for each incremental adjustment of the flow control element position, throughout the metering range of the metering valve yielding an exponentially varying mass flow rate as a result of linearly varying the flow control element position. The multi settings are not a simple disk as shown by the Simplified Flow Meter with Improved Accuracy.

A more recent device for fluid control is taught by U.S. Pat. No. 5,760,301 (1998) issued to Shuman, Jr. This device taught a flow meter for a gas pressure regulator. The device is a gas pressure regulator which includes a pressure regulator for connection to a source of high pressure gas, and flow meter or flow regulator that selectively varies the flow rate of delivered gas. The flow meter includes a ring with orifices of varying sizes radially spaced about a ring, with each orifice corresponding to a predetermined flow rate. A manually rotatable cap has a central axial bore and a spool extends through the aperture in both the ring and the central bore of the cap to secure them to the base of the flow meter. Gas is delivered at the selected flow rate directly from the end of the flow meter, rather than from a transverse side. The device is Complex with many component parts. Another U.S. Pat. No. 6,202,483 (2001) was issued to Barcus called a volumetric flow metering apparatus. It reveals a volumetric flow meter that includes a defined volume and sensors that detect when liquid begins to fill the defined volume and when that volume is full. A circuit or equivalent logic providers a manner to generate a signal representative of flow rate based on the size of the defined volume and time required to fill that volume. The whole control mechanism is unlike the Ertl device and components.

Finally, a U.S. Pat. No. 7,293,471 (2007) issued to Lund Bo, et al. teaches a flow meter for measuring fluid mixtures. The device uses a complex set of components and interconnections to provide a measuring device. As far as known, there are no other flow meter devices at the present time which fully provide these improvements and functional characteristics as the present device called a Simplified Flow meter with Improved Accuracy. It is believed that this device is made with fewer parts with improved configurations and physical features to provide more functionality when compared to other currently utilized flow meter devices or methods to measure flow. To the best knowledge of the inventor, this combination and use has not been anticipated by other products, patents or combinations of patents in view of each other. The particular combinations of materials and features are unique and novel and are not anticipated by prior art. Likewise, use of Simplified Flow meter with Improved Accuracy provides significant benefits compared to prior art devices.

SUMMARY OF THE INVENTION

A new device called the Simplified Flow meter with Improved Accuracy has been developed and designed to provide a unique combination that is specifically related to devices and methods to measure flow of gases and liquids in pipes. The Simplified Flow meter with Improved Accuracy may be used with small and large applications where a flow needs to be measured.

The preferred embodiment of Simplified Flow meter with Improved Accuracy device 31 is comprised of a meter body 32; an orifice disk 43 with features; a sealing means 50; a cover means 33, and a means to secure the device 31 into a fluid stream wherein the special device 31 may be used as a device to easily and accurately measure fluid flow in a pipe or the like.

OBJECTS AND ADVANTAGES

There are several objects and advantages of the Simplified Flow meter with Improved Accuracy device. There are currently no known fluid meter devices that are effective at providing the objects of this invention.

The following TABLE A summarizes various advantages and objects of the Simplified Flow meter with Improved Accuracy device. This list is exemplary and not limiting to the many advantages offered by this new device.

TABLE A

Various Benefits, Advantages, Characteristics and Objects of this device:

| ITEM | DESCRIPTION |
|---|---|
| 1 | Is more efficient |
| 2 | Has fewer parts |
| 3 | Is simple |
| 4 | Is versatile |
| 5 | Can be scaled to different sizes |
| 6 | Designed for manufacturability |
| 7 | Uses many common materials in new configurations |
| 8 | Does not require nuts, bolts, springs, clips, or any other fasteners to secure the orifice body in place. |
| 9 | Is interchangeable with current systems |
| 10 | Integrates the sealing components into the orifice body. |
| 11 | Does not require a breach of the piping system to change orifice sizes. |
| 12 | Useable with different gauges - analog and digital |
| 13 | Is a single body construction. |
| 14 | Does not have to be separated/split to install or change the orifice body. |
| 15 | Can accept a direct-mounted transmitter or gauge. |
| 16 | Allows the orifice body to be changed without disrupting or removing the transmitter, manifold, or tubing. |

Noteworthy is that other advantages and additional features of the present Simplified Flow meter with Improved Accuracy device will be more apparent from the accompanying drawings and from the full description of the device. For one skilled in the art of fluid metering devices, it is readily understood that the features shown in the examples with this device are readily adapted for improvement to other types of mechanisms and devices for use with the fluid processing industry in general and the measurements of fluids in particular.

DESCRIPTION OF THE DRAWINGS—FIGURES

The accompanying drawings, which are incorporated in and constitute a part of this specification, illustrate a preferred and alternative embodiments for the simplified flow meter with improved accuracy. The drawings together with the summary description given above and a detailed description given below serve to explain the principles of the simplified flow meter with improved accuracy. It is understood, however, that the device is not limited to only the precise arrangements and instrumentalities shown.

FIGS. 1A and 1B are the general simplified flow meter with improved accuracy device and the device used in operation.

DESCRIPTION OF THE DRAWINGS—REFERENCE NUMERALS

The following list refers to the drawings:

TABLE B

Reference numbers

| Ref # | Description |
|---|---|
| 31 | General embodiment of the simplified flow meter with improved accuracy |
| 31A | Alternative embodiment of the simplified flow meter with improved accuracy |
| 32 | General meter body or structure |
| 33 | Orifice chamber cover plate |
| 34 | Fastening means of cover 33 to meter body 32 |
| 35 | Threaded aperture in meter body 32 for cover plate 33 |
| 36 | Threaded aperture in meter body 32 for mounting of meter |
| 37 | Reference item for size - here a quarter of a US dollar coin |
| 40 | Orifice chamber for puck |
| 42 | Especially sized Orifice for fluid flow |
| 43 | Orifice disk/puck/bisket |
| 50 | Sealing means such as a groove or labyrinth for an o-ring or the like |
| 50A | O-ring or the like |
| 51 | Means to insert/remove such as a set screw or the like |
| 54 | Upstream flow |
| 55 | Downstream flow |
| 56 | Upstream Pressure tap/connection |
| 57 | Downstream Pressure tap/connection |
| 58 | Isolation Valve |
| 59 | Upstream sensing line |
| 60 | Downstream sensing line |
| 61 | Differential gauge - analog such as a magnehelic |
| 61A | Differential gauge - digital output |
| 70 | Use of simplified flow meter with improved accuracy |
| 71 | Another use of simplified flow meter with improved accuracy |
| 80 | Prior art device |

DETAILED DESCRIPTION OF PREFERRED EMBODIMENT

The present invention presented is a new device called the Simplified Flow meter with Improved Accuracy that has been developed and designed to provide a unique combination that is specifically related to devices and methods to measure flow of gases and liquids in pipes. The Simplified Flow meter with Improved Accuracy may be used with small and large applications where a flow needs to be measured.

Figure 2:
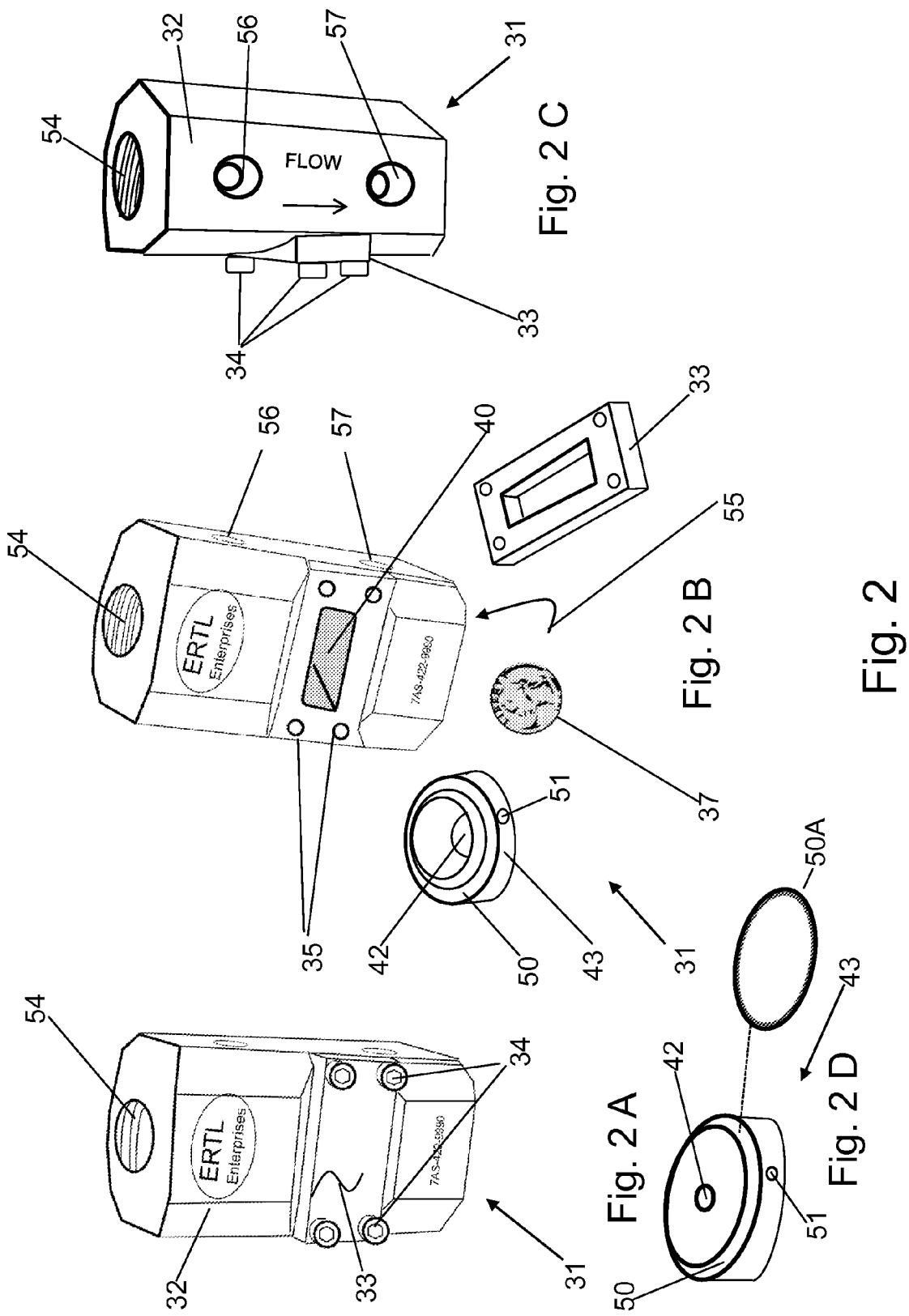
FIGS. 2A through 2D are sketches of the simplified flow meter with improved accuracy with components shown and described.
Figure 3:
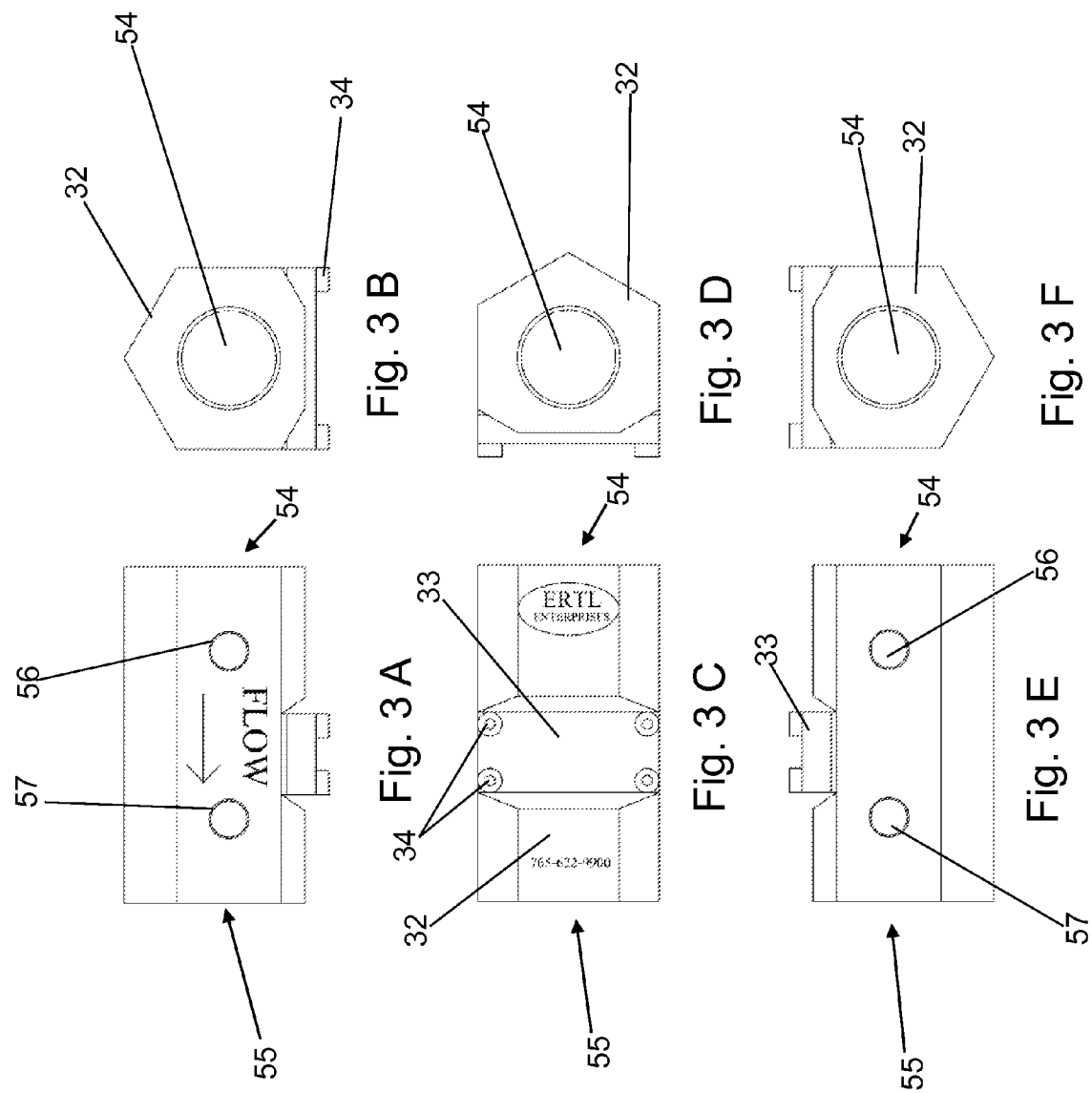
FIGS. 3A through 3F are sketches of the simplified flow meter with improved accuracy with components described.
Figure 4:
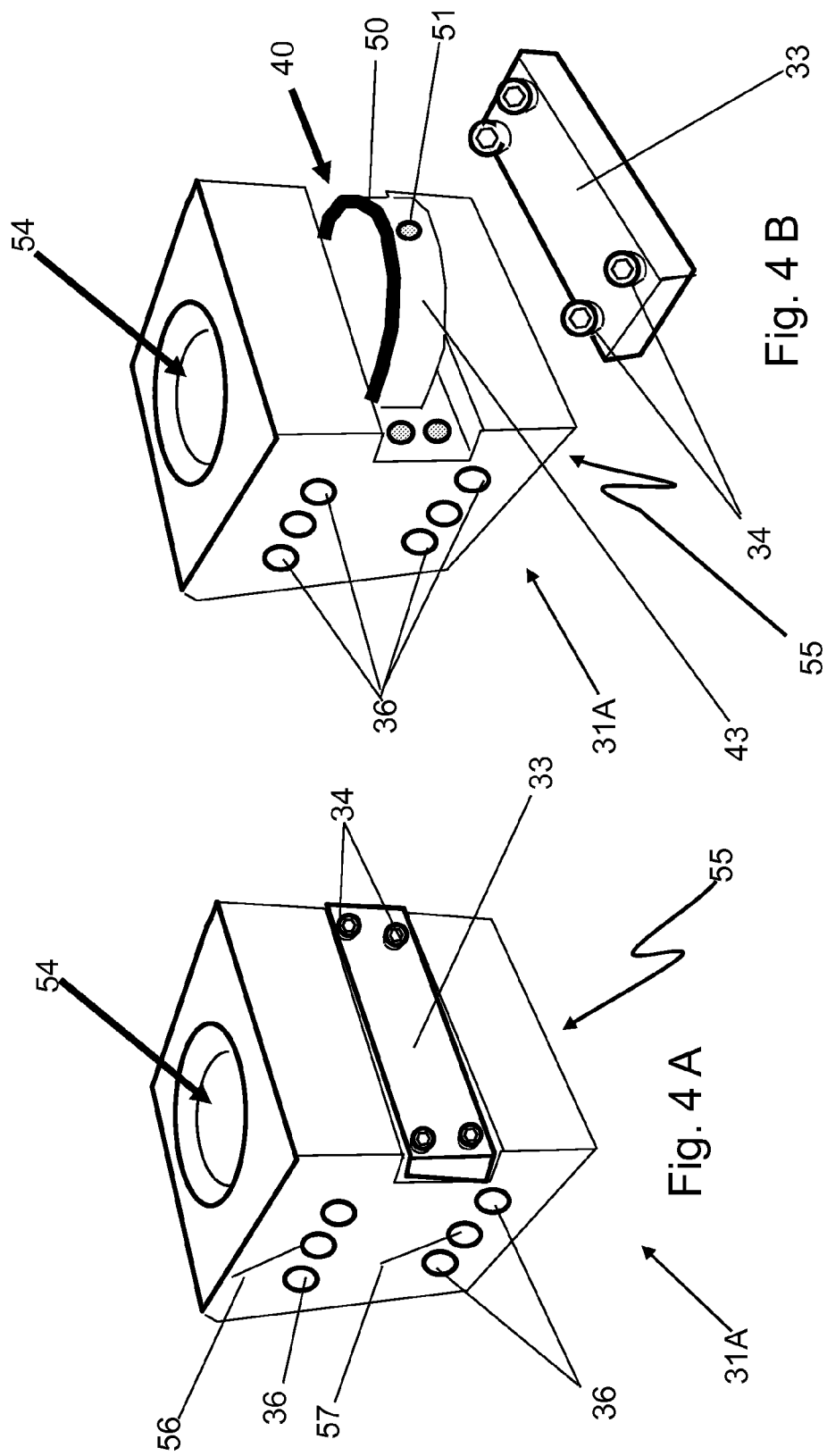
FIGS. 4A and 4B are sketches of an alternative embodiment of the simplified flow meter with improved accuracy of a different size with components delineated.
Figure 5:
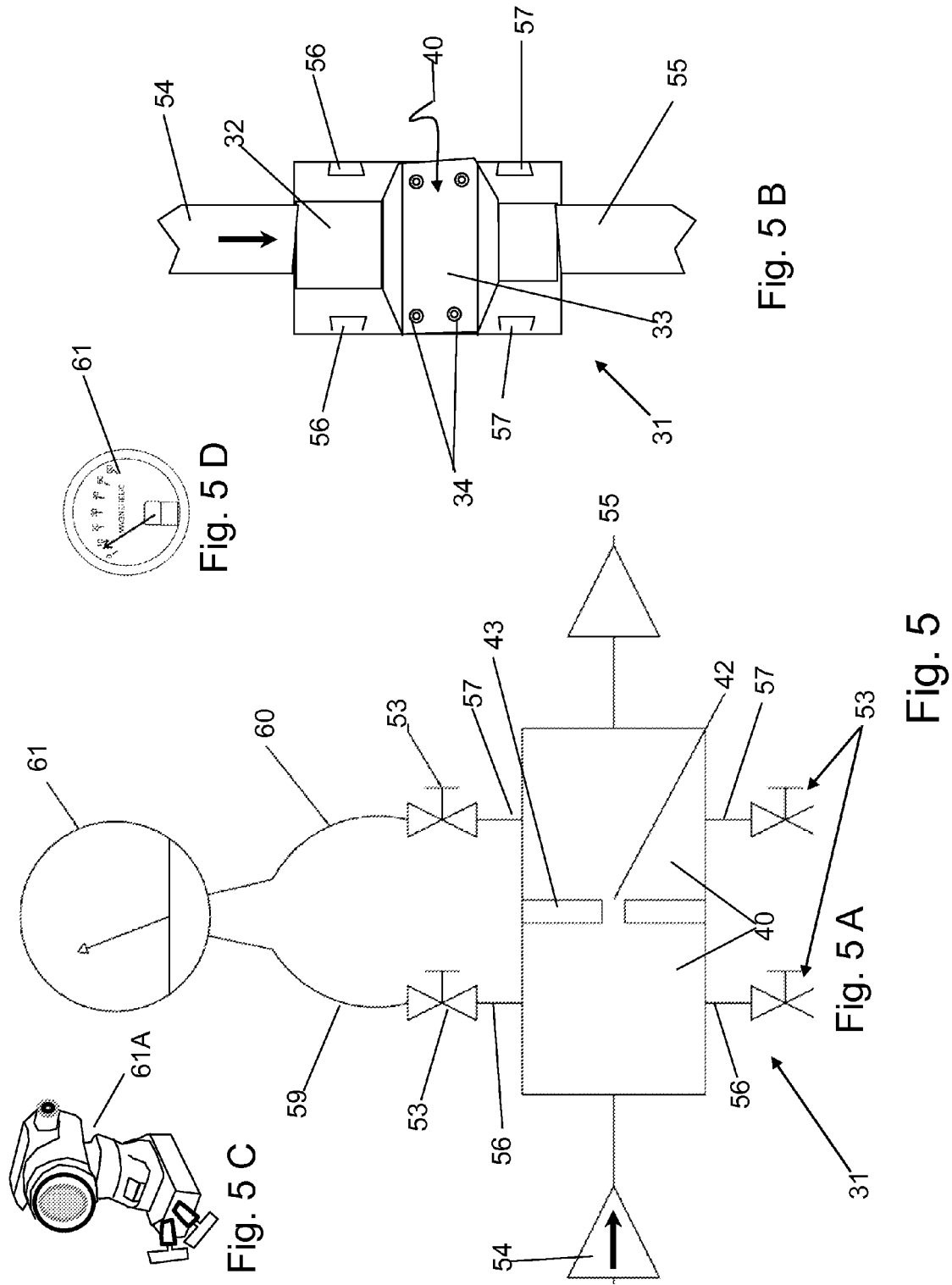
FIGS. 5A through 5D are sketches of the device in use.
Figure 6:
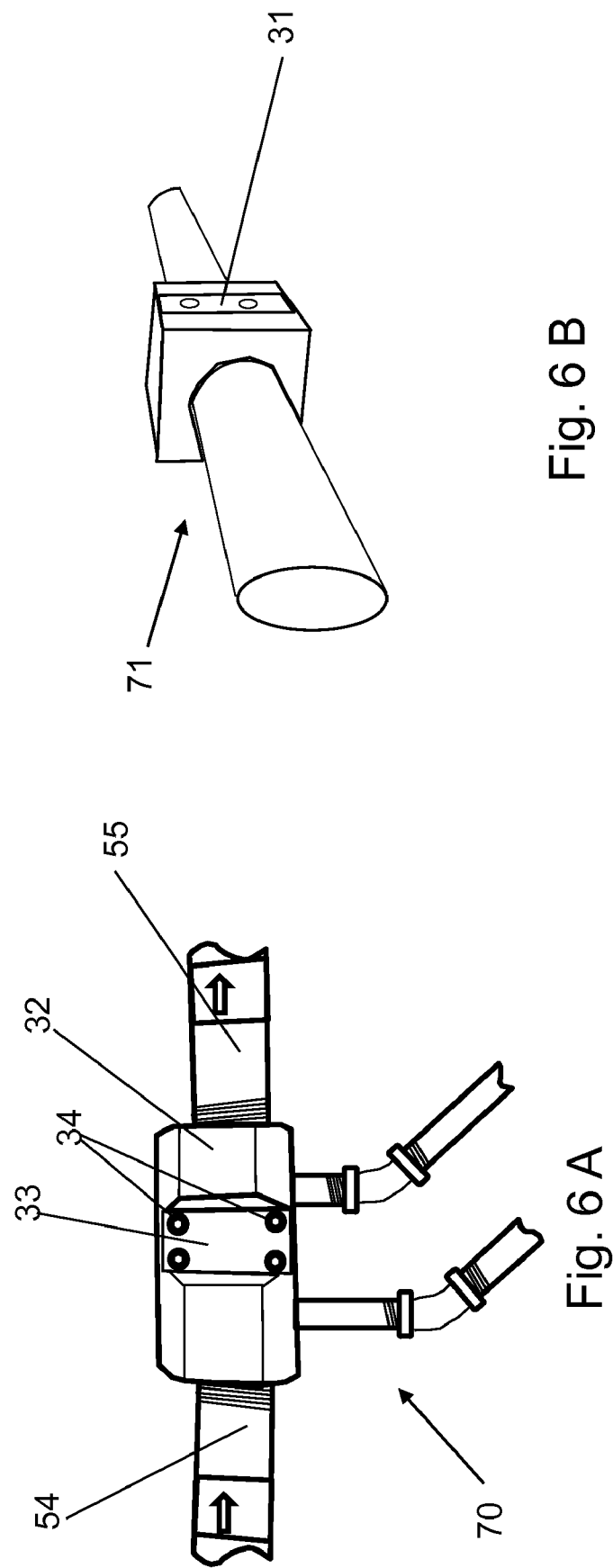
FIGS. 6A and 6B are sketches of the device in use.
Figure 7:
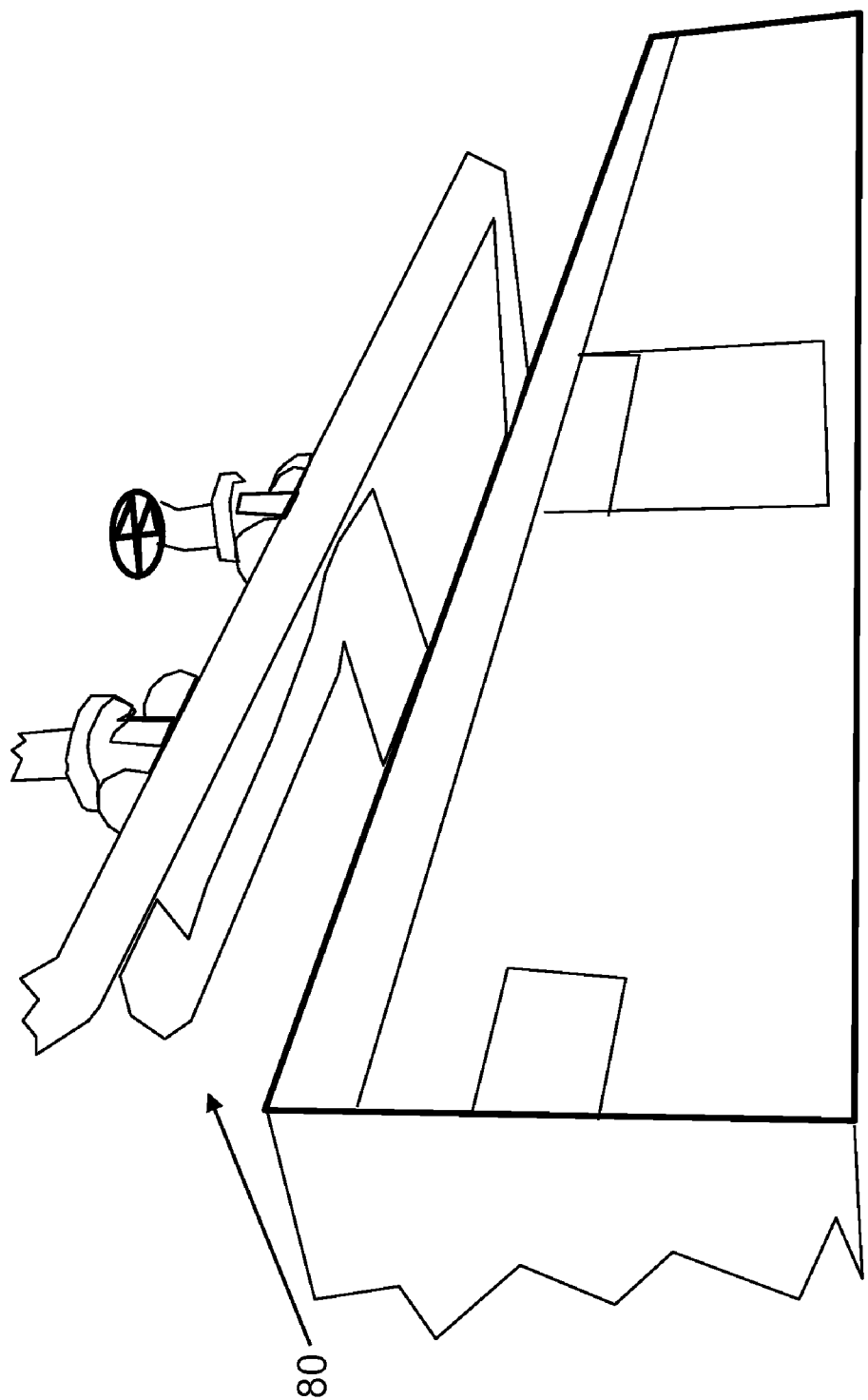
FIG. 7 is a sketch of an example of prior art for fluid flow measurement.

There is shown in FIGS. 1-8 a complete detail and operative embodiment of the Simplified Flow meter with Improved Accuracy 31. In the drawings and illustrations, one notes well that the FIGS. 1 through 4 detail the special configuration and FIGS. 5 and 6 shows the use and operation. FIG. 7 show some prior art in the fluid measurement field for reference.

The advantages for the Simplified Flow meter with Improved Accuracy are listed above in the introduction. Succinctly the benefits are the device:

Is more efficient
Has fewer parts
Is simple
Is versatile
Can be scaled to different sizes
Designed for manufacturability
Uses many common materials in new configurations
Does not require nuts, bolts, springs, clips, or any other fasteners to secure the orifice body in place.
Is interchangeable with current systems
Integrates the sealing components into the orifice body.
Does not require a breach of the piping system to change orifice sizes.
Useable with different gauges—analog and digital
Is a single body construction.
Does not have to be separated/split to install or change the orifice body.
Can accept a direct-mounted transmitter or gauge.
Allows the orifice body to be changed without disrupting or removing the transmitter, manifold, or tubing.

The preferred embodiment of Simplified Flow meter with Improved Accuracy 31 is comprised of a meter body 32; an orifice disk 43 with features; a sealing means 50; a cover means 33, and a means to secure the device 31 into a fluid stream wherein the special device 31 may be used as a device to easily and accurately measure fluid flow in a pipe or the like.

The accompanying drawings and sketches, which are incorporated in and constitute a part of this specification, illustrate a preferred embodiment of the Simplified Flow meter with Improved Accuracy device 31. The drawings together with the summary description given above and a detailed description given below serve to explain the principles of the Simplified Flow meter with Improved Accuracy device 31. It is understood, however, that the device 31 is not limited to only the precise arrangements and instrumentalities shown.

FIG. 1A is the general simplified flow meter with improved accuracy device 31. FIG. 1B shows the device as it is used in normal operation 70.

FIGS. 2A through 2D are sketches of the simplified flow meter with improved accuracy 31 with components shown and described. FIG. 2A is a front view showing the main body 32 and the cover plate 33. The cover plate 33 is attached by a fastening means 34 such as bolts or the like. The device 31 has an aperture through the entire length of the body 32 with openings at either end. The upstream opening 54 is viewed with a fastening and securing means such as threads. Other means for soldering, brazing, adhesive means or other fastening means of securing the device 31 to pipes in operation may also be within the scope and spirit of the device 31. The main device 31 and its components are shown as a brass material. As one skilled in piping and fluid devices well appreciates, the materials could be other metals such as steel, steel alloys, copper, aluminum, titanium, and the like. Other composite materials and reinforced, high temperature plastics may be used to provide a device as shown and configured. FIG. 2B is a sketch with all the component parts shown. The cover plate 33 and main body 32 is shown. The puck or disk chamber 40 is where the special disk 43 is placed when the device is assembled. The disk 43 has a special sized and precision bored aperture 42. This aperture or orifice is precision bored and sized to provide the meter with the proper restriction in the lain to create the pressure differential and hence permit the calculation of the flow by the pressure drop. Other features of the disk 43 include the sealing groove 50 to accept a flexible and elastic "O-ring" 50A or the like. There are a plethora of rubbers, synthetic materials, and the like to provide a seal between the disk 43 and the main body 32. A means to insert 51 the disk 43 is accomplished with a configuration such as a tapped and threaded hole for example. A reference US quarter 37 is shown for a size reference. However, the concept and device anticipates virtually all sizes from very large pipes to small tubes. The configuration and size shown is for example and not limiting the scope of the device 31. FIG. 2C is a side view showing the upstream pressure tap 56 and the downstream pressure tap 57. FIG. 2D is another orifice sized for a different application. Other components have already been described. The overall scope covers many sizes and materials as described above.

FIGS. 3A through 3F are sketches of the simplified flow meter 31 with improved accuracy with components described. These various views delineate the body 32, the cover plate 33, the cover fastening means 34, the upstream tap 56, the downstream tap 57, the upstream flow connection 54 and the downstream flow connection 55. Materials and other configurations are described above.

FIGS. 4A and 4B are sketches of an alternative embodiment 31A of the simplified flow meter with improved accuracy of a different size with components delineated. Of significance is the upstream flow 54 with a means to weld a pipe directly such as a pipe socket. Also one notes the mounting apertures 36 in the meter body 32 that permits various ways to mount the device 31A in a piping scheme. The other components are the same as described in FIG. 2, above.

FIG. 7 is an example of prior art 80 for fluid flow measurement. One skilled in the art of fluid flow measurement may note well the awkward size and complexity of the installation as compared with the simplified flow meter with improved accuracy 31.

All of the details mentioned here are exemplary and not limiting. Other components specific to describing a Simplified Flow meter with Improved Accuracy device 31 may be added as a person having ordinary skill in the field of fluid measurement well appreciates.

Operating of the Preferred Embodiment

The preferred embodiment of a Simplified Flow meter with Improved Accuracy 31 is comprised of a meter body 32; an orifice disk 43 with features; a sealing means 50; a cover means 33, and a means to secure the device 31 into a fluid stream wherein the special device 31 may be used as a device to easily and accurately measure fluid flow in a pipe or the like. These features and details of the device 31 are described above. The manner of how the device operates is described below. One skilled in the art of fluid measurement devices will note that the description above and the operation described here must be taken together to fully illustrate the concept of the Simplified Flow meter with Improved Accuracy device 31. FIGS. 5 and 6 are examples of how to use the Simplified Flow meter with Improved Accuracy device 31.

FIGS. 5A through 5D are sketches of the device 31 in use. The sketch in FIG. 5A shows a schematic with the upstream flow 54 passing through the meter 31 and flowing through the orifice 42 of the disk 43. The pressure tap upstream 56 and pressure tap downstream 57 both are connected to isolation valves 53 that then connect to a differential gauge 61. FIGS. 5C and D show a standard analog gauge 61 such as a magnehelic or the like and a digital output flow indicator 61A. FIG. 5B is a top view that demonstrates that the pressure tap upstream 56 and pressure tap downstream 57 are on both sides of the meter to permit connections in the field. This simple method of measurement uses an orifice plate, which is basically a plate with a hole through it. It is placed in the fluid flow and constricts the flow.

$$Q = A \times v$$

Q is flow rate, A is the cross sectional area of the pipe, and v is the average fluid velocity in the pipe. Putting this equation into action, the flow of a fluid traveling at an average velocity of a 1 meter per second through a pipe with a 1 square meter cross-sectional area is 1 cubic meter per second. Note that Q is a volume per unit time, so Q is commonly denoted as the "volumetric" flow rate. An orifice plate method uses the same principle as the venturi meter in that the differential pressure relates to the velocity of the fluid flow (Bernoulli's principle). The venturi meter constricts the flow in some fashion, and measure the differential pressure (using a pressure sensor) that results across the constriction. The flow rate is determined by the pressure drop for a given area of the pipe. This method is widely used to measure flow rate in the transmission of gas through pipelines, and has been used since Roman Empire times.

FIGS. 6A and 6B are sketches 70, 71 of the device 31 in use. The device is connected similarly to the description in FIG. 5A.

With the above description it is to be understood that the Simplified Flow meter with Improved Accuracy device 31 is not to be limited to only the disclosed embodiment. The features of the Simplified Flow meter with Improved Accuracy device 31 are intended to cover various modifications and equivalent arrangements included within the spirit and scope of the description.

What is claimed is:

1. A simplified flow meter 31 with improved accuracy comprised of:
   (a) a meter body 32 configured with a puck chamber 40 and made of durable material;
   (b) an orifice puck 43 with a groove 50, an elastic o-ring sealing means 50A, and a precision bored aperture 42 through the orifice puck center, is being inserted in the puck chamber;
   (c) a cover plate 33,
   (d) a means 34 for attaching the cover plate 33 to the meter body 32; and
   (e) a means for removably securing the flow meter 31 into a fluid stream;
wherein the simplified flow meter 31 easily and accurately measures fluid flow in the fluid stream and the flow meter allows for the orifice puck to be changed without disrupting or removing the meter body from the fluid stream.

2. The flow meter according to claim 1 wherein the durable material for the meter body 32 is a composite material.

3. The flow meter according to claim 2 wherein the composite material is a sturdy, reinforced plastic material.

4. The flow meter according to claim 1 wherein the durable material for the meter body 32 is a metal material.

5. The flow meter according to claim 4 wherein the metal is brass.

6. The flow meter according to claim 4 wherein the metal is a steel alloy.

7. The flow meter according to claim 4 wherein the metal is aluminum.

8. The flow meter according to claim 4 wherein the metal is titanium.

9. The flow meter according to claim 1 wherein the elastic material for the sealing means is rubber.

10. The flow meter according to claim 1 wherein the elastic material for the sealing means is a synthetic material.

11. The flow meter according to claim 1 wherein the means for removably securing the flow meter 31 to the fluid stream is a threaded connection.

12. The flow meter according to claim 1 wherein the means for removably securing the flow meter 31 to the fluid stream is a welded connection.

13. The flow meter according to claim 1 wherein the means for removably securing the flow meter 31 to the fluid stream is a brazed connection.

14. The flow meter according to claim 1 wherein the means for removably securing the flow meter 31 to the fluid stream is by an adhesive material to make a connection.

15. The flow meter according to claim 1 wherein the means for removably securing the flow meter 31 to the fluid stream is a soldered connection.

16. A simplified flow meter made essentially of a brass material comprised of:
   (a) a brass meter body 32 configured with a puck chamber 40;
   (b) a brass orificed puck 43 with a groove, an elastic o-ring 50A, and a precision bored aperture 42 through the orificed puck center, is being inserted in the puck chamber;
   (c) a cover plate 33,
   (d) a means 34 for attaching the cover plate 33 to the meter body 32; and
   (e) a means for removably securing the flow meter 31 into a fluid stream;
wherein the simplified flow meter 31 easily and accurately measures fluid flow in the fluid stream and allows for the orificed puck to be changed without disrupting or removing the meter body from the fluid stream.

* * * * *